US010323501B2

United States Patent
Weston et al.

(10) Patent No.: US 10,323,501 B2
(45) Date of Patent: Jun. 18, 2019

(54) METHOD AND APPARATUS FOR GENERATING WEIGHTED AVERAGE SURVEY

(71) Applicant: Gyrodata, Incorporated, Houston, TX (US)

(72) Inventors: John Lionel Weston, Christchurch (GB); Stephen Victor Mullin, Kingwood, TX (US); Roger Ekseth, Trondheim (NO)

(73) Assignee: Gyrodata, Incorporated, Houston, TX (US)

( * ) Notice: Subject to any disclaimer, the term of this patent is extended or adjusted under 35 U.S.C. 154(b) by 1266 days.

(21) Appl. No.: 13/791,603

(22) Filed: Mar. 8, 2013

(65) Prior Publication Data

US 2013/0282290 A1    Oct. 24, 2013

Related U.S. Application Data

(60) Provisional application No. 61/636,351, filed on Apr. 20, 2012.

(51) Int. Cl.
*E21B 47/00* (2012.01)
*G06F 17/00* (2019.01)
(Continued)

(52) U.S. Cl.
CPC ............ *E21B 47/00* (2013.01); *E21B 47/022* (2013.01); *E21B 47/0905* (2013.01); *G01V 1/46* (2013.01); *G01V 9/00* (2013.01); *G06F 17/00* (2013.01)

(58) Field of Classification Search
CPC .......... G06F 17/00; G06F 17/18; G06F 17/40; G01V 11/00; G01V 3/00; G01V 3/38;
(Continued)

(56) References Cited

U.S. PATENT DOCUMENTS 7,002,484 B2   2/2006  McElhinney
7,117,605 B2   10/2006  Ekseth et al.
(Continued)

OTHER PUBLICATIONS

Williamson H.S. (2000) "Accuracy Prediction for Directional Measurement While Drilling," Paper SPE 67616, SPE Drilling and Completion, 15 (4), Dec. 2000.
(Continued)

*Primary Examiner* — Sujoy K Kundu
*Assistant Examiner* — Lynda Dinh
(74) *Attorney, Agent, or Firm* — Pramudji Law Group PLLC; Ari Pramudji

(57) ABSTRACT

A computer-based method of generating a survey of a wellbore section is provided. The method includes analyzing a plurality of surveys of the wellbore section to identify survey measurements that do not comprise gross errors, generating an initial weighted average survey, and calculating an initial set of measurement differences between the identified survey measurements and the initial weighted average survey. The method further includes calculating a plurality of error term estimates for the plurality of surveys and using the plurality of error term estimates to correct the identified survey measurements. The method further includes generating an updated weighted average survey and calculating an updated set of measurement differences between the identified survey measurements and the updated weighted average survey.

27 Claims, 3 Drawing Sheets

(51) Int. Cl.
  *E21B 47/022* (2012.01)
  *E21B 47/09* (2012.01)
  *G01V 1/46* (2006.01)
  *G01V 9/00* (2006.01)

(58) Field of Classification Search
  CPC ........ G01V 3/46; G01V 1/50; G01V 2200/16;
       E21B 47/00; E21B 47/02; E21B 47/022;
       E21B 47/0905
  USPC .......................................................... 702/6–9
  See application file for complete search history.

(56) References Cited

U.S. PATENT DOCUMENTS

| 7,991,553 | B2 | 8/2011 | Alumbaugh et al. | |
| 2005/0224257 | A1* | 10/2005 | Ekseth | E21B 47/022 175/45 |
| 2010/0145621 | A1 | 6/2010 | Moake | |
| 2010/0198518 | A1* | 8/2010 | Ekseth | E21B 47/022 702/6 |
| 2011/0067859 | A1* | 3/2011 | Ekseth | E21B 17/203 166/255.1 |

OTHER PUBLICATIONS

Torkildsen T., et al. "Prediction of Wellbore Position Accuracy When Surveyed With Gyroscopic Tools," Paper SPE 90408, SPE Drilling and Completion, 23 (1), 2004.

Ekseth R., et al. (2011) "Improving the Quality of Ellipse of Uncertainty Calculations in Gyro Surveys to Reduce the Risk of Hazardous Events like Blowouts or Missing Potential Production through Incorrect Wellbore Placement," Paper SPE 140192, SPE/IADC Drilling Conference and Exhibition, Amsterdam, Mar. 1-3, 2011.

Ekseth R., et al. (2010) "High Integrity Wellbore Surveying," Paper SPE 133417, SPE Drilling and Completion, 25 (10), Dec. 2010.

Ekseth R., et al. (2010) "Wellbore positions obtained while drilling by the most advanced magnetic surveying methods may be less accurate than predicted," Paper SPE-128217-PP, IADC/SPE Drilling Conference and Exhibition, Feb. 2-4, 2010.

Ekseth R., et al. (2006) "The Reliability Problem Related to Directional Survey Data," Paper IADC/SPE 103734, IADC/SPE Asia Pacific Drilling Technology Conference and Exhibition, Bangkok, Thailand, Nov. 13-15, 2006.

Ekseth R., et al. (2007) "High Integrity Wellbore Surveys: Methods for Eliminating Gross Errors," Paper SPE/IADC 105558, SPE/IADC Drilling Conference, Amsterdam, The Netherlands, Feb. 20-22, 2007.

Yik-Kiong Hue, (2006) "Analysis of Electromagnetic Well-Logging Tools," Dissertation Presented in Partial Fulfillment of the Requirement for the Degree Doctor of Philosophy in the Graduate School of The Ohio State University, 2006.

Mikada, H., Becker, K., Moore, J.C., Klaus, A., et al., (2002), "Proceedings of the Ocean Drilling Program", Initial Reports vol. 196.

* cited by examiner

METHOD AND APPARATUS FOR GENERATING WEIGHTED AVERAGE SURVEY

CROSS-REFERENCE TO RELATED APPLICATIONS

This application claims the benefit of priority to U.S. Provisional Appl. No. 61/636,351, filed on Apr. 20, 2012 and incorporated in its entirety by reference herein.

BACKGROUND

Field of the Application

This application is generally directed to wellbore survey systems and methods.

Description of the Related Art

It is common practice today for the definitive survey of a wellbore or well to be established by a high accuracy gyroscopic survey taken after drilling of the well is completed. All other survey data acquired during drilling are discarded at this point.

SUMMARY

A computer-based method of generating a survey of a wellbore section is provided. The method comprises analyzing a first survey of the wellbore section to identify survey measurements of the first survey that do not comprise gross errors, and analyzing a second survey of the wellbore section to identify survey measurements of the second survey that do not comprise gross errors. The method further comprises generating an initial weighted average survey by combining the identified survey measurements of the first survey multiplied by a first initial weighting function and the identified survey measurements of the second survey multiplied by a second initial weighting function. The method further comprises calculating an initial first set of measurement differences between the identified survey measurements of the first survey and the initial weighted average survey, and calculating an initial second set of measurement differences between the identified survey measurements of the second survey and the initial weighted average survey. The method further comprises (e.g., labeled "a") calculating a first estimate of error terms for the first survey using the first set of measurement differences, and calculating a second estimate of error terms for the second survey using the second set of measurement differences. The method further comprises (e.g., labeled "b") using the first estimate of error terms to correct the identified survey measurements of the first survey, and using the second estimate of error terms to correct the identified survey measurements of the second survey. The method further comprises (e.g., labeled "c") generating an updated weighted average survey by combining the corrected identified survey measurements of the first survey multiplied by a first corresponding weighting function and the corrected identified survey measurements of the second survey multiplied by a second corresponding weighting function. The method further comprises (e.g., "d") calculating an updated first set of measurement differences between the identified survey measurements of the first survey and the updated weighted average survey, and calculating an updated second set of measurement differences between the identified survey measurements of the second survey and the updated weighted average survey. The method further comprises (e.g., labeled "e") using the updated first set of measurement differences and the updated second set of measurement differences, iterating "a"-"d" until one or more conditions for terminating the iterations are met.

Calculating the first estimate of error terms can comprise using a first least squares estimation and calculating the second estimate of error terms comprises using a second least squares estimation. The first survey and the second survey can be independent of one another. The first survey can be generated using a first survey sensor and the second survey can be generated using a second survey sensor different from the first survey sensor. The identified survey measurements from the first survey sensor can have a first accuracy and the identified survey measurements from the second survey sensor can have a second accuracy different from the first accuracy.

The first survey and the second survey can be inclination surveys and at least one of the first survey and the second survey can be generated by one or more accelerometers and has error terms resulting from at least one of the group consisting of: inclination offset, residual bias, and sag. The first survey and the second survey can be azimuth surveys, and at least one of the first survey and the second survey can be generated by one or more gyroscopes and has error terms resulting from at least one of the group consisting of: residual bias, mass unbalance offset, and linear drift. At least one of the first survey and the second survey can comprise a stationary gyroscopic survey. At least one of the first survey and the second survey can comprise a continuous gyroscopic survey. The first survey and the second survey can be azimuth surveys, and at least one of the first survey and the second survey can be generated by one or more magnetic sensors and has error terms resulting from axial magnetic interference.

The first initial weighting function can be different from the second initial weighting function. The first initial weighting function can comprise error variances of the identified survey measurements of the first survey, and the second initial weighting function can comprise error variances of the identified survey measurements of the second survey. The first corresponding weighting function can be the first initial weighting function and the second corresponding weighting function can be the second initial weighting function. Generating the updated weighted average survey can comprise calculating the first corresponding weighting function by updating the first initial weighting function and calculating the second corresponding weighting function by updating the second initial weighting function.

The method can further comprise performing at least one of the first survey and the second survey of the wellbore section. Performing the at least one of the first survey and the second survey can occur at least partially while drilling the wellbore section. At least one of the first survey and the second survey of the wellbore section can be generated using a survey sensor of a steerable wellbore drilling tool, and the method can further comprise using at least one updated weighted average surveys to steer the wellbore drilling tool while drilling.

A system for generating a survey of a wellbore section is provided. The system comprises one or more hardware processors in communication with at least one computer-readable memory that stores software modules including instructions that are executable by the one or more hardware processors. The software modules can include at least an analysis computer module configured to identify survey measurements of at least a first survey and a second survey that do not comprise gross errors. The software modules can further include at least a weighted average survey computer module configured to calculate a weighted average survey based on the identified survey measurements of the first survey multiplied by a first weighted function and the identified survey measurements of the second survey multiplied by a second weighted function. The software modules can further include at least a difference computer module configured to calculate a first set of measurement differences between the identified survey measurements of the first survey and the weighted average survey and to calculate a second set of measurement differences between the identified survey measurements of the second survey and the weighted average survey. The software modules can further include at least an error computer module configured to calculate a first estimate of error terms for the first survey using the first set of measurement differences and to calculate a second estimate of error terms for the second survey using the second set of measurement differences. The software modules can further include at least a correction computer module configured to use the first estimate of error terms to correct the identified survey measurements of the first survey and to use the second estimate of error terms to correct the identified survey measurements of the second survey. The software modules can further include at least a control computer module configured to provide the corrected identified survey measurements of the first survey and the corrected identified survey measurements of the second survey to the weighted average survey computer module such that the weighted average survey computer module, the difference computer module, the error computer module, and the correction computer module are iteratively used until one or more conditions for terminating the iterations are met.

The system can further comprise at least one first survey sensor configured to generate the first survey and at least one second survey sensor configured to generate the second survey. The at least one second survey sensor can be different from the at least one first survey sensor. The first survey and the second survey can be inclination surveys, and at least one of the first survey sensor and the at least one second survey sensor can comprise one or more accelerometers with error terms resulting from at least one of the group consisting of: inclination offset, residual bias, and sag. The first survey and the second survey can be azimuth surveys, and at least one of the first survey sensor and the at least one second survey sensor can comprise one or more gyroscopes with error terms resulting from at least one of the group consisting of: residual bias, mass unbalance offset, and linear drift. The first survey and the second survey can be azimuth surveys, and at least one of the first survey sensor and the at least one second survey sensor comprise one or more magnetic sensors with error terms resulting from axial magnetic interference.

The at least one computer-readable memory can further store at least the first survey, the second survey, and at least one updated weighted average survey. The error computer module can be further configured to calculate the first estimate of error terms for the first survey using a first least squares estimation and to calculate the second estimate of error terms for the second survey using a second least squares estimation. The first weighting function can be different from the second weighting function. The first weighed function can comprise error variances of the identified survey measurements of the first survey, and the second weighting function can comprise error variances of the identified survey measurements of the second survey.

The system can further comprise a steerable wellbore drilling tool and the system can be configured to steer the wellbore drilling tool while drilling in response to at least one updated weighted average survey.

A non-transitory computer storage can be provided having stored thereon a computer program that instructs a computer system to generate a survey of a wellbore section by at least analyzing a plurality of surveys of the wellbore section to identify survey measurements of the plurality of surveys that do not comprise gross errors. The computer system can be further instructed by the computer program at least to generate an initial weighted average survey by combining the identified survey measurements of the plurality of surveys multiplied by initial weighting functions. The computer system can be further instructed by the computer program at least to calculate an initial set of measurement differences between the identified survey measurements of the plurality of surveys and the initial weighted average survey. The computer system can be further instructed by the computer program at least (e.g., labeled "a") to calculate a plurality of error term estimates for the plurality of surveys using the set of measurement differences. The computer system can be further instructed by the computer program at least (e.g., labeled "b") to use the plurality of error term estimates to correct the identified survey measurements of the plurality of surveys. The computer system can be further instructed by the computer program at least (e.g., labeled "c") to generate an updated weighted average survey by combining the corrected identified survey measurements of the plurality of surveys multiplied by corresponding weighting functions. The computer system can be further instructed by the computer program at least (e.g., labeled "d") to calculate an updated set of measurement differences between the identified survey measurements of the plurality of surveys and the updated weighted average survey. The computer system can be further instructed by the computer program at least (e.g., labeled "e") to use the updated set of measurement differences, iterating (a)-(d) until one or more conditions for terminating the iterations are met.

DETAILED DESCRIPTION

Figure 1:
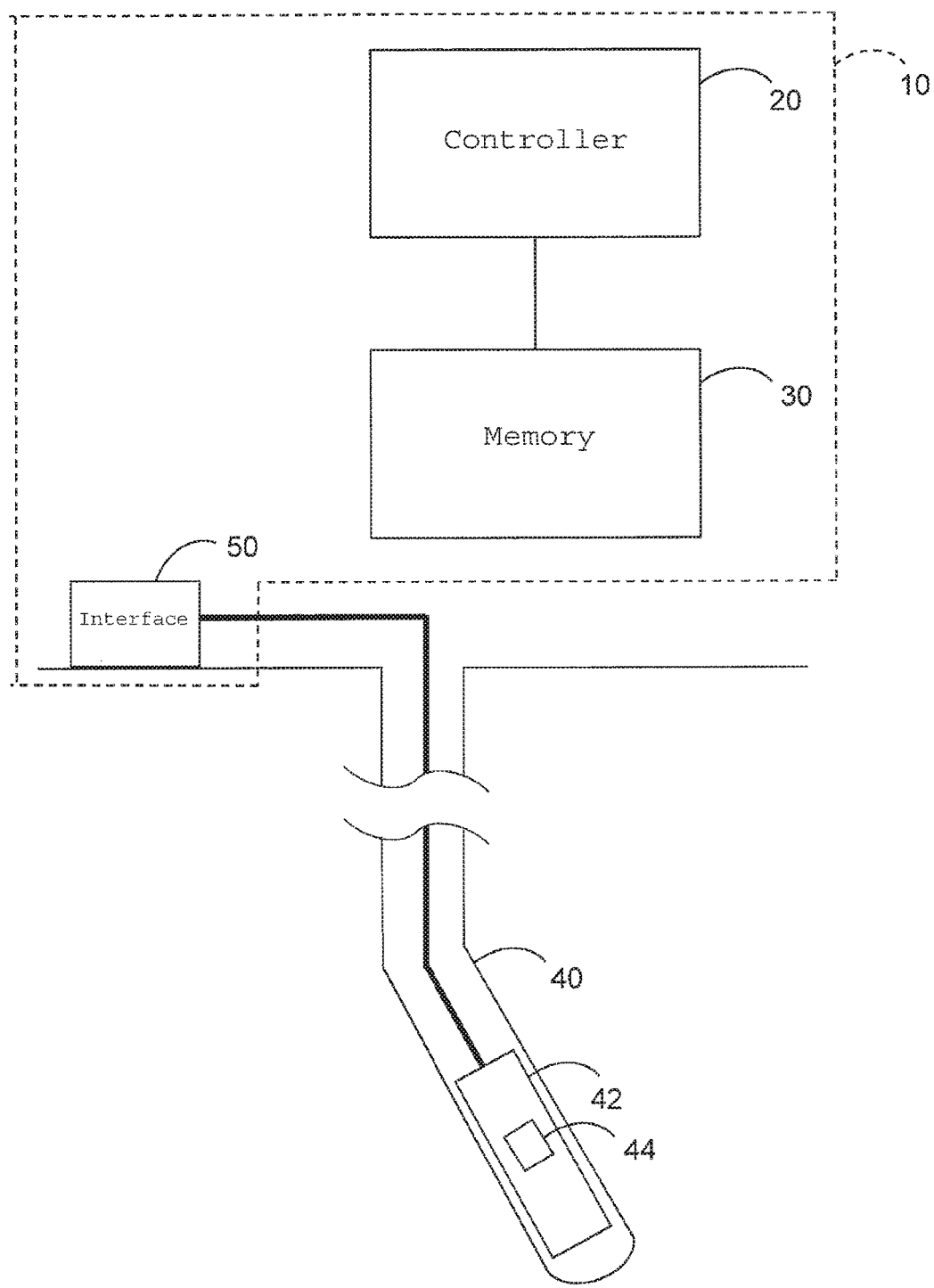
FIG. 1 schematically illustrates an example computer system in accordance with certain embodiments described herein.

In certain embodiments described herein, a method is provided for combining two or more surveys of a given well section to maximize the accuracy of the combined surveys. The method includes first checking each survey for gross errors. Surveys (e.g., survey measurements) without a gross error are combined with a corresponding weighting factor to form an initial weighted mean survey. The differences between the survey measurements and the weighted mean survey can be used as inputs to an adjustment process (e.g., a least squares adjustment process) which estimates the dominant error terms present in each survey. These error estimates can be used to correct the measurements of each survey which, in turn, can update the survey error models and form a new average survey. Iterations can be continued to create improved average surveys until the errors are within a prescribed tolerance. Any survey type can be used in this process (e.g., accelerometers, magnetometers, gyroscopes, and combinations thereof), and the surveys can include data generated during drilling by a "measurement while drilling" (MWD) sensor system or a "gyro while drilling" (GWD) sensor system.

With the introduction of high inclination gyro while drilling (GWD) tools, it will be possible using certain embodiments described herein to establish a definitive survey in real-time while drilling progresses. As the number of data sets available increases as drilling progresses, in certain embodiments, the accuracy to which the current location is known can continue to increase as drilling gets deeper and closer to target.

In certain embodiments, the GWD sensor can be run at the same time as a magnetic measurement while drilling (MWD) sensor. These two readings can be continually checking each other for gross error detection purposes. The two sets of data from these sensors can be combined mathematically to produce a survey of higher accuracy than either of the two individual data sets alone. As the GWD sensor is being withdrawn from the hole (e.g., during a "tripping out of hole" procedure, by which the bottom hole assembly, including the survey tools and drill bit, is brought to the surface a section of pipe at a time, and is held stationary as each successive section or stand of pipe is disconnected at the surface), the GWD sensor can be switched into multishot mode and used to gather another survey of the wellbore on the trip out of hole (e.g., by taking one or more survey measurements each time the survey tool becomes stationary, sometimes called a "trip survey"). This multishot survey can then be combined with the combination survey obtained while drilling.

The methodology described herein can continue while drilling the entire wellbore and on every trip out of the hole, e.g., the GWD sensor in multishot mode is surveying the newly drilled section and re-surveying the previously surveyed sections. Every data set can be quality controlled and combined with the earlier surveys allowing continually increasing accuracy.

Combining Multiple Surveys

Given two or more surveys of a given well section, a best estimate of the well path can be achieved by simply averaging those surveys at common depths. Assuming two independent surveys of a well are available, surveys that have been generated using surveys tools of similar performance capability, a straight average can be taken. The expected accuracy of the average survey is then expected to be improved by a factor of root two over the accuracy of the individual surveys taken in isolation. A greater number of independent surveys will give rise to a corresponding increase in the accuracy of the combined survey; averaging n surveys will result in an improvement in accuracy over the individual surveys by a factor of root n.

Multiple surveys of a well section may of course be generated using different types of survey tools, with the expected accuracy varying in accordance with the defined error model for each type of tool. In such a case, it is appropriate to take a weighted average of these surveys, the weighting factors being derived directly from the survey performance defined by their respective error models. For example, various papers describe error models for different types of survey tools, including but not limited to, Williamson H. S. (2000) "*Accuracy Prediction for Directional Measurement While Drilling*," Paper SPE 67616, SPE Drilling and Completion, 15 (4), December 2000; Torkildsen T., et al. (2008) "*Prediction of Wellbore Position Accuracy When Surveyed With Gyroscopic Tools*," Paper SPE 90408, SPE Drilling and Completion, 23 (1), March 2008; Ekseth R., et al. (2011) "*Improving the Quality of Ellipse of Uncertainty Calculations in Gyro Surveys to Reduce the Risk of Hazardous Events like Blowouts or Missing Potential Production through Incorrect Wellbore Placement*," Paper SPE 140192, SPE/IADC Drilling Conference and Exhibition, Amsterdam, 1-3 Mar. 2011; Ekseth R., et al. (2010) "*High Integrity Wellbore Surveying,*" Paper SPE 133417, SPE Drilling and Completion, 25 (10), December 2010; Ekseth R., et al. (2010) "*Wellbore positions obtained while drilling by the most advanced magnetic surveying methods may be less accurate than predicted*," Paper SPE-128217-PP, IADC/SPE Drilling Conference and Exhibition, 2-4 Feb. 2010; Ekseth R., et al. (2006) "*The Reliability Problem Related to Directional Survey Data*," Paper IADC/SPE 103734, IADC/SPE Asia Pacific Drilling Technology Conference and Exhibition, Bangkok, Thailand, 13-15 Nov. 2006; and Ekseth R., et al. (2007) "*High Integrity Wellbore Surveys: Methods for Eliminating Gross Errors*," Paper SPE/IADC 105558, SPE/IADC Drilling Conference, Amsterdam, The Netherlands, 20-22 Feb. 2007.

While such averaging procedures will give rise to some improvement in the accuracy of the combined survey as described above, a further reduction in the estimated errors in the combined survey can be achieved by certain embodiments described herein. For example, a procedure can include a weighted averaging process in combination with a least squares adjustment scheme in order to estimate and correct for the major error sources that could be present in the individual surveys. This procedure may be iterated a number of times in order to converge on an optimal solution. Any number of surveys may be included in the process, and additional surveys incorporated as they become available at different stages of the drilling process. It is advantageous that each new survey be quality controlled (e.g., checks being made to ensure that no survey measurements with gross errors are introduced into the calculation, errors which would cause the error model assumptions for that survey to become invalid) before that survey is incorporated into the multi-survey averaging process, as described more fully below.

In certain embodiments, substantial improvements in the accuracy of the resulting survey can be achieved by adopting a procedure of this type, the resulting survey being potentially more accurate than that achieved by the simple averaging processes described earlier. The procedure, which can be referred to as a multiple survey adjustment procedure, is described more fully below.

FIG. 1 schematically illustrates an example computer system 10 in accordance with certain embodiments described herein. The computer system 10 can comprise a controller 20 (e.g., one or more processors or microprocessors) in operable communication with at least one computer-readable memory 30 configured to store data and to store software modules that include instructions that are executable by the controller 20. In certain embodiments, the computer system 10 comprises a bus (not shown) operative to transfer data between portions of the computer system 10 (e.g., between the controller 20 and the at least one computer-readable memory 30).

The computer system 10 is operative to generate a survey of at least a section of a wellbore 40 in response to sensor measurements from at least one downhole tool 42 comprising one or more sensors 44 and configured to be inserted into the wellbore 40 being surveyed. In certain embodiments, the system 10 comprises the at least one computer-readable memory 30 (as shown schematically in FIG. 1), while in other embodiments, some or all of the at least one computer-readable memory 30 is separate from the system 10. The system 10 of certain embodiments can further comprise some of the at least one downhole tool 42 (e.g., the one or more sensors 40 or a directional drilling system) or all of the at least one downhole tool 42.

The data can comprise some or all of the sensor measurements generated by the one or more sensors 44 of the at least one downhole tool 42 (e.g., sensor measurements indicative of locations of the one or more sensors 44 within the wellbore 40 as a function of position along the wellbore 40). The at least one computer-readable memory 30 can be in any of several forms. For example, in certain embodiments, the at least one computer-readable memory 30 comprises read-only memory, dynamic random-access memory, flash memory, hard disk drive, compact disk, and/or digital video disk.

The computer system 10 can comprise hardware, software, or a combination of both hardware and software. In certain embodiments, the computer system 10 comprises a standard personal computer or microcontroller. In certain embodiments, the computer system 10 is distributed among multiple computers. In certain embodiments, the computer system 10 comprises appropriate interfaces (e.g., network cards and/or modems) to receive measurement signals from the one or more sensors 44. For example, as schematically illustrated by FIG. 1, the computer system 10 comprises an interface 50 in operative communication (e.g., by electrical or optical conduits, or wirelessly) with the one or more sensors 44 and in operative communication (e.g., by electrical or optical conduits, or wirelessly) with other portions of the computer system 10 (e.g., the one or more processors 20 or the at least one computer-readable memory 30). In certain embodiments, signals from the downhole tool 42 (e.g., signals from the one or more sensors 44) are transmitted by one or more signal conduits (e.g., electrical or optical wires or cables) extending along an elongate portion of the wellbore 40, to the interface 50 through which the signals are transmitted to the controller 20 and/or other portion of the computer system 10 with which the controller 20 is in communication (e.g., the at least one computer-readable memory 30). In certain embodiments in which the controller 20 is adapted to generate control signals for various components of the at least one downhole tool 42 (e.g., control signals configured to direct or control a directional drilling system of the downhole tool 42), the interface 50 and the one or more signal conduits are adapted to transmit the control signals from the controller 20 to the wellbore 42.

The computer system 10 can comprise standard communication components (e.g., keyboard, mouse, toggle switches) for receiving user input, and can comprise standard communication components (e.g., image display screen, alphanumeric meters, printers) for displaying and/or recording operation parameters, casing orientation and/or location coordinates, or other information relating to the wellbore 40, the at least one downhole tool 42, and/or the one or more sensors 44. In certain embodiments, at least a portion of the computer system 10 is located within a downhole portion of the at least one downhole tool 42. In certain other embodiments, at least a portion of the computer system 10 is located at the surface and is communicatively coupled to a downhole portion of the downhole tool 42 within the wellbore 40.

In certain embodiments, a computer-readable storage medium is provided that has stored thereon a computer program that instructs a computer system to generate a survey of a wellbore section. The computer-readable storage medium can be in any of several forms. For example, in certain embodiments, the computer-readable storage medium is tangible and comprises read-only memory, dynamic random-access memory, flash memory, hard disk drive, compact disk, and/or digital video disk. The computer-readable storage medium has computer-executable components or modules, executed on a computer system having at least one computing device. The computer system on which the computer-executable components are executed can be any of the computer systems described above with respect to other embodiments.

Multiple Survey Adjustment Procedure

In certain embodiments, the multiple survey adjustment procedure described here is based on the application of an iterative estimation (e.g., least squares) process which seeks to form estimates of the likely major errors in the individual surveys which are available, and is an example of the type of process that may be implemented with a view to making the best use of all available survey data for a given section of well. A survey in accordance with certain embodiments described herein can comprise tens or hundreds of survey measurements, for which a computer system is advantageously used. In addition, the computing burden for the procedures described herein can be quite large such that they cannot be performed practically through manual calculations. To obtain meaningful estimates of errors, certain embodiments described herein utilize a sufficient number of survey measurements to conduct the comparisons, and some variation in the well geometry over the wellbore section being surveyed can contribute to the efficiency of the method and to allow good estimates of the errors to be obtained.

Where the terms "first" and "second" are used herein to refer to various quantities, functions, differences, and mathematical terms, "first" and "second" are not to be interpreted as limiting the methods and systems described herein to only two of these quantities, functions, differences, and mathematical terms, but encompass "two or more" of these quantities, functions, differences, and mathematical terms. For example, by referring to a first survey and a second survey in generating the resultant survey of the wellbore section, it is understood that embodiments described herein are applicable to "two or more" surveys (e.g., three, four, five, or more surveys), and are not limited to only two surveys. In addition, the terms "first" and "second" are not to be interpreted as denoting a particular order of these quantities, functions, differences, and mathematical terms. Furthermore, while portions of certain embodiments are described herein in an order (and these portions may be labeled with numbers or letters (e.g., "a," "b," "c," etc.), such ordered description or labeling is not to be interpreted as limiting these portions in any particular order, and it is to be understood that other orders of these portions can be compatible with certain embodiments described herein.

Figure 2:
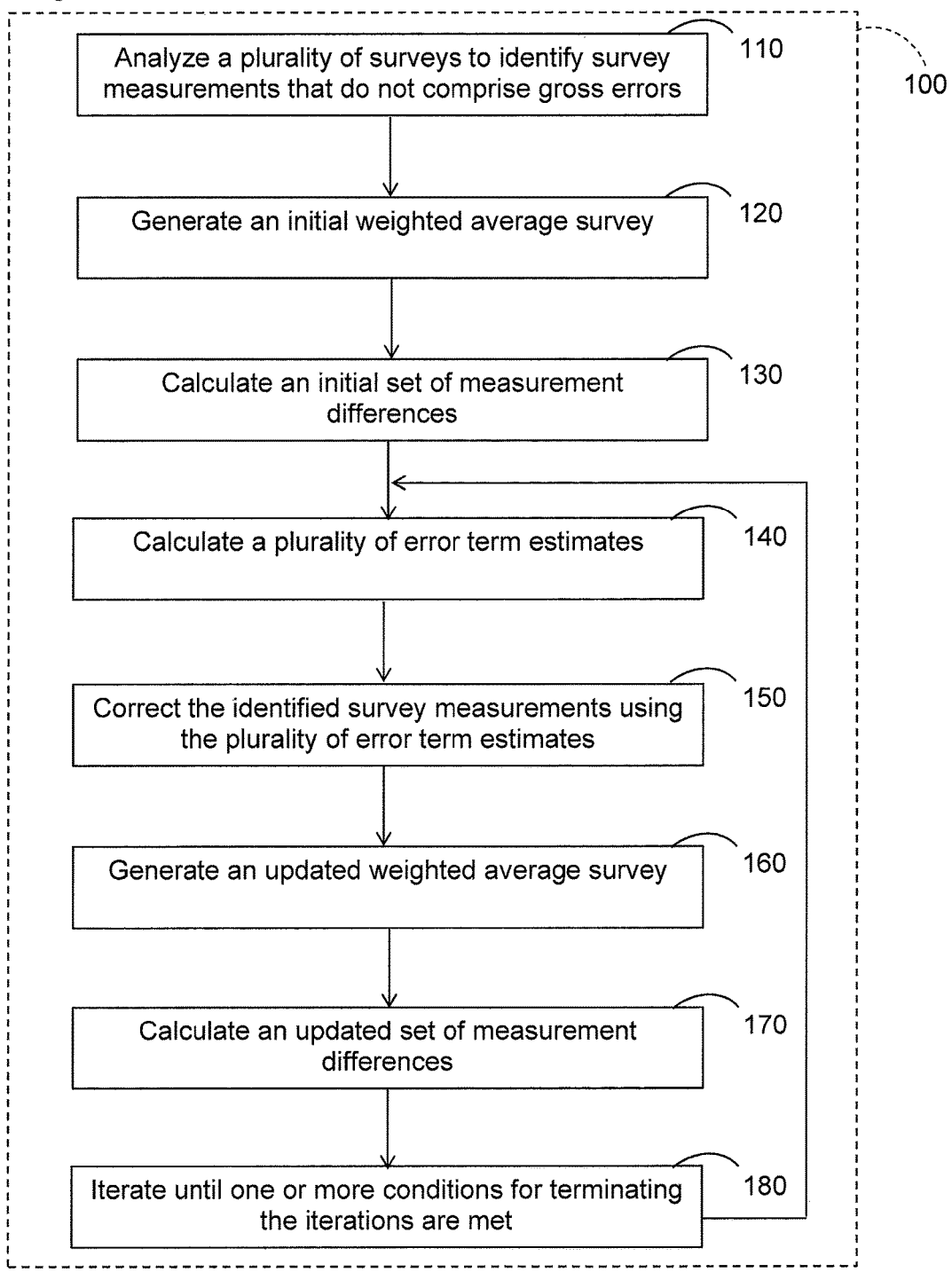
FIG. 2 is a flowchart of an example computer-based method of generating a survey of a wellbore section in accordance with certain embodiments described herein.

FIG. 2 is a flowchart of an example computer-based method 100 of generating a survey of a wellbore section in accordance with certain embodiments described herein. In an operational block 110, the method 100 analyzes a first survey of the wellbore section to identify survey measurements of the first survey that do not comprise gross errors, and analyzes a second survey of the wellbore section to identify survey measurements of the second survey that do not comprise gross errors. In an operational block 120, the method further comprises generating an initial weighted average survey by combining the identified survey measurements of the first survey multiplied by a first initial weighting function and the identified survey measurements of the second survey multiplied by a second initial weighting function. In an operational block 130, the method 100 further comprises calculating an initial first set of measurement differences between the identified survey measurements of the first survey and the initial weighted average survey, and calculating an initial second set of measurement differences between the identified survey measurements of the second survey and the initial weighted average survey. In an operational block 140, the method 100 further comprises calculating a first estimate of error terms for the first survey using the first set of measurement differences, and calculating a second estimate of error terms for the second survey using the second set of measurement differences. In an operational block 150, the method 100 further comprises using the first estimate of error terms to correct the identified survey measurements of the first survey, and using the second estimate of error terms to correct the identified survey measurements of the second survey. In an operational block 160, the method 100 further comprises generating an updated weighted average survey by combining the corrected identified survey measurements of the first survey multiplied by a first corresponding weighting function and the corrected identified survey measurements of the second survey multiplied by a second corresponding weighting function. In an operational block 170, the method 100 further comprises calculating an updated first set of measurement differences between the identified survey measurements of the first survey and the updated weighted average survey, and calculating an updated second set of measurement differences between the identified survey measurements of the second survey and the updated weighted average survey. In an operational block 180, the method 100 further comprises iterating the operational blocks 140, 150, 160, and 170, using the updated first set of measurement differences and the updated second set of measurement differences, until one or more conditions for terminating the iterations are satisfied.

The following description provides examples of the procedures corresponding to the operational blocks of the example method 100 are described in more detail below for different types of wellbore surveys.

In certain embodiments, analyzing a plurality of surveys of the wellbore section (e.g., a first survey and a second survey) in the operational block 110 comprises implementing accepted quality control (QC) checks to identify survey measurements of the plurality of surveys that do not comprise gross errors (e.g., survey measurements of the first survey that do not comprise gross errors and survey measurements of the second survey that do not comprise gross errors). For example, survey measurements which deviate by more than three standard deviations (e.g., ±3σ) from the expected value as defined by the error model can be classified as gross errors (e.g., noisy measurements) which are to be omitted from further analysis.

In certain embodiments, the QC check of the surveys can be conducted in accordance with the procedures described in Ekseth R., et al. (2010) "*High Integrity Wellbore Surveying*," Paper SPE 133417, SPE Drilling and Completion, 25 (10), December 2010, which is incorporated by reference herein in its entirety. This process can be used to identify survey measurements having gross errors and survey measurements that do not have gross errors. Such a process can involve internal data checks for the respective individual surveys (e.g., checks for consistency among the survey measurements of a survey), as well as the comparisons of survey measurements of two or more surveys (e.g., involving inclination, azimuth and coordinate difference tests), which can be the most reliable and effective means of checking that individual surveys are free from gross errors, e.g., that each survey measurement of the survey confirms to its expected error model. Advantageously, such QC checks can be carried out before implementing the further procedures of the method 100, since the assumption of survey conformance with its appropriate error model is implicit in these procedures.

In certain embodiments, the surveys of the plurality of surveys are independent from one another (e.g., the first survey and the second survey are independent from one another). For example, the first survey can be generated using at least a first survey sensor (e.g., one or more accelerometers, gyroscopes, or magnetometers) and the second survey can be generated using at least a second survey sensor different from the first survey sensor (e.g., one or more accelerometers, gyroscopes, or magnetometers that are different than those that generated the first survey). The identified survey measurements from the first survey sensor can have a first accuracy and the identified survey measurements from the second survey sensor can have a second accuracy different from the first accuracy.

In certain embodiments, the surveys comprise inclination surveys, at least one of which was generated by one or more accelerometers, and has error terms resulting from at least one of the group consisting of: inclination offset, residual bias, and sag. In certain embodiments, the surveys comprise azimuth surveys, at least one of which was generated by one or more gyroscopes (e.g., as a stationary gyroscopic survey or as a continuous gyroscopic survey) and has error terms resulting from at least one of the group consisting of: residual bias, mass unbalance offset, and linear drift. In certain embodiments, the surveys comprise azimuth surveys, at least one of which is generated by one or more magnetic sensors and has error terms resulting from axial magnetic interference.

In certain embodiments, generating an initial weighted average survey (e.g., an initial weighted mean survey) for the surveys available of a wellbore section in the operational block 120 comprises calculating a product of the survey measurements identified as not comprising gross errors for each survey (e.g., the first survey and the second survey) by an appropriate weighting function for the survey (e.g., a first initial weighting function and a second initial weighting function). These products can then be combined together to form the initial weighted average survey. The initial weighting functions can be chosen in accordance with the expected variances of the errors in the respective surveys, as described more fully below. The variances can be determined from error models of the different survey types which are built into the software or stored in the at least one computer-readable memory. The weighting functions for different surveys can be different from one another (e.g., the first initial weighting function can be different from the second initial weighting function). The weighting functions can comprise error variances of the identified survey measurements of the corresponding surveys.

For example, given n independent surveys, the uncertainty weighted average azimuth ($\bar{A}$) at each survey station/depth can be given by:

$$\bar{A} = \frac{\sum_{i=1}^{n} w_i A_i}{\sum_{i=1}^{n} w_i}$$

where $A_i$=azimuth measurement for survey i
$w_i=1/\sigma_i^2$=weighting function for survey i
$\sigma_i^2$=variance of azimuth error as defined by the error model for survey i Similarly, the mean inclination can be calculated at each depth as well by using a similar relation.

In certain embodiments, an initial set of measurement differences between the identified survey measurements of each survey (e.g., the first survey and the second survey) and the initial weighted average survey is calculated in the operational block 130. For inclination surveys, inclination measurement differences ($\Delta I$) can be formed at each survey station i in accordance with the following equation:

$$\Delta I = I_i - \bar{I}$$

For azimuth surveys, azimuth measurement differences ($\Delta A$) can be calculated at each survey station i in accordance with the following equation:

$$\Delta A = A_i - \bar{A}$$

In certain embodiments, calculating estimates of error terms for the surveys (e.g., the first survey and the second survey) in the operational block 140 can form estimates of the dominant error terms in the individual surveys using a least squares estimation or an equivalent process. For example, calculating the first estimate of error terms for a first survey can comprise using a first least squares estimation and calculating the second estimate of error terms for a second survey can comprise using a second least squares estimation.

Although they may be obtained concurrently with one another, azimuth surveys and inclination surveys can be calculated separately from one another. The azimuth and inclination differences can form inputs to least squares adjustment processes in which azimuth corrections and inclination corrections are treated separately from one another. Such a process can be used to form estimates of dominant error terms which may be present in the individual azimuth surveys and inclination surveys.

Inclination can generally be computed using the measurements of specific force acceleration generated by a set of accelerometers which are mounted mutually orthogonal to one another within the wellbore survey tool. Errors in inclination therefore arise as a result of errors in the accelerometer measurements.

However, a major contributor to inclination uncertainty is sag which gives rise to a vertical misalignment of a survey tool such as an MWD tool or a gyro survey tool. Sag is dependent on the bottom hole assembly (BHA) that is used. Factors influencing the magnitude of the sag error include the drill collar stiffness, weight on bit which gives rise to a bending moment, the positioning of stabilizers along the tool string, drill bit location with respect to the survey sensor and whether or not a bent sub is in use. The gravity component perpendicular to the well path in the vertical plane largely determines the size of the sag error, at least for rotary drilling where no bent sub is in use. The inclination error ($\Delta I_{sag}$) attributable to sag is therefore assumed to be proportional to the sine of inclination (I). Hence, the inclination error attributable to sag can be expressed as:

$$\Delta I_{sag} = S \cdot \sin I$$

where S is the inclination error caused by sag when the well bore is horizontal. Since the sag error can be a major contributor to inclination uncertainty, it is common practice to form estimates and correct for this error.

For the purposes of this example of the multiple survey adjustment process, it is assumed that inclination errors result from an inclination offset, residual biases in the accelerometer measurements, and the effects of sag. The least squares adjustment may be used to form estimates of these error terms at each survey station.

Accelerometer biases (denoted $\Delta_{bx}$ $\Delta A_{by}$ $\Delta A_{bz}$) and sag ($\Delta S$) can be shown to give rise to inclination errors as indicated by the following equations.

$$\Delta I_{Abx} = -\frac{\cos I \sin \alpha}{g} \Delta A_{bx}$$

$$\Delta I_{Aby} = -\frac{\cos I \sin \alpha}{g} \Delta A_{by}$$

$$\Delta I_{Abz} = -\frac{\sin I}{g} \Delta A_{bz}$$

$$\Delta I_{sag} = \sin I \cdot \Delta S$$

where
I=inclination
$\alpha$=highside tool-face angle
g=acceleration due to gravity The error terms may be expressed in vector form as follows:

$$\Delta X = [1 \; \Delta A_{bx} \; \Delta A_{by} \; \Delta A_{bz} \; \Delta S]$$

A design matrix can be formed in accordance with the propagation of these errors at each station, viz.

$$H = \left[1 \; -\frac{\cos I \sin \alpha}{g} \; -\frac{\cos I \cos \alpha}{g} \; -\frac{\sin I}{g} \; \sin I\right]$$

A least squares estimate of the errors may be formed using:

$$\widehat{\Delta X} = (H^T P H) H^T P \Delta I = [\Delta I \; \Delta A_{bx} \; \Delta A_{by} \; \Delta A_{bz} \; \Delta S]$$

where P is a weighting factor based on the number of surveys available at each survey location. In certain embodiments, simplified versions of the equations given here may be used to avoid numerical problems in the computation.

In the case of stationary gyro surveys, for example, which rely on a gyrocompassing procedure, an azimuth offset together with gyro biases and a mass unbalance offset can be expected to be the dominant sources of error. The least squares adjustment may be used to form estimates of these error terms at each survey station. Residual gyro biases ($\Delta G_{bx}$ $\Delta G_{by}$) and a mass unbalance offset ($\Delta G_{mu}$) can be shown to give rise to azimuth errors as indicated by the following equations.

$$\Delta A = \frac{(\cos A \cos I \cos \alpha - \sin A \sin \alpha)}{\Omega \cos \phi \cos I} \Delta G_{bx}$$

$$\Delta A = \frac{-(\cos A \cos I \sin \alpha + \sin A \cos \alpha)}{\Omega \cos \phi \cos I} \Delta G_{by}$$

$$\Delta A = -\frac{g \sin A \tan I}{\Omega \cos \phi} \Delta G_{mu}$$

where
I=inclination
α=highside tool-face angle
Ω=Earth rate
φ=latitude of the survey station The error terms may be expressed in vector form as follows:

$$\Delta X = [\Delta A \; \Delta G_{bx} \; \Delta G_{by} \; \Delta G_{mu}]$$

A design matrix can be formed in accordance with the propagation of these errors at each station, viz.

$$H = \left[1 \; \frac{(\cos A \cos I \cos \alpha - \sin A \sin \alpha)}{\Omega \cos \phi \cos I} \; \frac{(\cos A \cos I \sin \alpha + \sin A \cos \alpha)}{\Omega \cos \phi \cos I} \; -\frac{g \sin A \tan I}{\Omega \cos \phi}\right]$$

A least squares estimate of the errors may be formed using:

$$\widehat{\Delta X} = (H^T \; P \; H) H^T \; P \; \Delta l = [\Delta A \; \Delta G_{bx} \; \Delta G_{by} \; \Delta G_{mu}]$$

In certain embodiments, different or additional error terms may be included and simplified versions of the equations given here may be used to avoid numerical problems in the computation.

The formulation of the least squares estimation process will vary in accordance with the type of survey system used to form estimates of the error terms associated with that survey. Illustrations of the least squares estimation processes to be implemented for continuous gyro surveys and magnetic surveys are given below by way of further examples.

For continuous gyro surveys, the initial azimuth error and the linear gyro drift can be estimated. For a continuous survey system incorporating x and y-axis gyros only, the azimuth angle can be calculated from the time integral of the following expression for azimuth rate:

$$\dot{A} = -\frac{(G_x \sin \alpha + G_y \cos \alpha)}{\sin I} + \Omega_H \cos A \cot I - \Omega_V$$

Therefore, a linear drift in the x and y gyros gives rise to an azimuth error that is inversely proportional to the sine of inclination. Hence, a design matrix for a least squares estimation of the initial azimuth offset and a linear drift term ($\Delta_{LD}$) may be written as:

$$H = \left[1 \; \frac{\Delta_{LD} n_s}{\sin I}\right]$$

where $n_s$ denotes the number of survey stations used.

A least squares estimate of the azimuth initialization error and the linear drift may be formed using:

$$\widehat{\Delta X} = (H^T \; P \; H) H^T \; P \; \Delta l = [\Delta A \; \Delta_{LD}]$$

For magnetic surveys, errors in magnetic declination ($\Delta_{DEC}$) and axial magnetic interference ($\Delta_{AMI}$) can be dominant and can therefore be included in the least square process. Declination is the angle between true north and magnetic north at the well location. An error in this quantity gives rise directly to an azimuth error. Axial magnetic interference gives rise to an azimuth error in accordance with the following equation:

$$\Delta A = \sin I \sin A_M \Delta_{AMI}$$

where $A_M$=magnetic azimuth.

The design matrix for this situation is given by:

$$H = [1 \; \sin I \sin A_M]$$

and a least squares estimate of the declination and axial interference terms may be formed using:

$$\widehat{\Delta X} = (H^T \; P \; H) H^T \; P \; \Delta l = [\Delta_{DEC} \; \Delta_{AMI}]$$

In certain embodiments, different or additional error terms may be included in the estimation process. For example, latitude dependent magnetic declination may be included, which takes account of the increasing difficulty of determining declination as the horizontal component of the Earth's magnetic field decreases with latitude.

Various correction methods, which include axial interference correction, in-field referencing techniques, and multi-station correction, are often used to enhance the performance of traditional magnetic measurement while drilling surveys. In such cases, the error terms which can be taken account of in the estimation of azimuth errors can be selected in accordance with the correction procedure that is used.

In certain embodiments, the estimates of error terms can be used to correct the identified survey measurements of the plurality of surveys in the operational block 150. For example, inclination survey measurements can be corrected in the operational block 150 using:

$$I_{corr} = I - \Delta I - S \cdot \sin I,$$

and corrections to the accelerometer measurements ($A_x$, $A_y$, $A_z$) along the x, y and z axes of the survey tool can be applied as follows:

$$A_{x_{corr}} = A_x - \Delta A_{bx}$$

$$A_{y_{corr}} = A_y - \Delta A_{by}$$

$$A_{z_{corr}} = A_z - \Delta A_{bz}$$

The corrected accelerometer measurements can be used to form subsequent estimates of inclination.

Corrections of azimuth measurements from stationary gyro/gyrocompass surveys can be corrected using:

$$A_{corr} = A - \Delta A,$$

and corrections to the gyro measurements ($G_x$, $G_y$) about the x and y axes of the survey tool can be applied as follows:

$$G_{x_{corr}} = G_x - \Delta G_{bx} - \Delta G_{mu} A_x$$

$$G_{y_{corr}} = G_y - \Delta G_{by} - \Delta G_{mu} A_y$$

where $A_x$, $A_y$=accelerations measured along x, y axes of the survey tool. The corrected gyro measurements can be used to form subsequent estimates of azimuth.

Corrections of azimuth measurements from continuous gyro surveys can be corrected using:

$$A_{corr} = A - \Delta A - \Delta_{LD} \cdot v/d$$

where v is the velocity of the survey tool as it traverses the well and d is the survey depth interval.

Corrections of azimuth measurements from basic magnetic surveys can be corrected using:

$$A_{corr} = A - \Delta_{DEC} - \sin I \sin A_M \Delta_{AMI}$$

In certain embodiments, generating an updated weighted average survey in the operational block 160 can comprise calculating a product of the corrected identified survey measurements for each survey by a corresponding weighting function for the survey. These products can then be combined together to form the updated weighted average survey. In certain embodiments, the corresponding weighting functions used in the operational block 160 can be the initial weighting functions used in the operational block 120 in generating the initial weighted average survey. In certain other embodiments, generating the updated weighted average survey can comprise calculating the corresponding weighting functions by updating the initial weighting functions. For example, one or more of the corresponding weighting functions used in the operational block 160 to generate the updated weighted average survey can be updates of the initial weighting functions used in the operational block 120, and these updates can comprise values updated based on the survey error model (e.g., standard deviations of errors) for the corresponding one or more surveys).

For example, in certain such embodiments, the updated azimuth standard deviation can be calculated using the following equation, based on the azimuth differences between survey i and the average survey:

$$\hat{\sigma}_i = \sqrt{\frac{\sum_{i=1}^{n} w_i (A_i - \overline{A})^2}{(n-1)\sum_{i=1}^{n} w_i}}$$

where $\hat{\sigma}_i$=updated azimuth standard deviation for survey i.

The inclination standard deviation may be updated in certain embodiments in a similar manner based in the inclination differences between survey i and the average survey.

In certain embodiments, calculating updated sets of measurement differences between the identified survey measurements of the surveys and the updated weighted average survey in the operational block 170 can comprise performing a similar calculation as described above with regard to calculating the initial sets of measurement differences in the operational block 130.

In certain embodiments, iterating the operational blocks 140, 150, 160, and 170, using the updated sets of measurement differences from the previous iteration, is performed until one or more conditions for terminating the iterations is met. For example, a condition for terminating the iterations can be met when differences between sequential updated weighted average surveys are within a predetermined tolerance (e.g., convergence is achieved). In certain such embodiments, the predetermined tolerance for either an inclination survey or an azimuth survey can be defined to be less than 0.01 degrees, less than 0.05 degrees, or less than 0.1 degrees, or another predetermined level. In certain embodiments, the stability and/or repeatability of the inclination or azimuth survey outputs can be checked, and error estimates over two or three iterations can be checked, and a condition for terminating the iterations can be met upon one or more of these quantities reaching predetermined levels. In certain embodiments, the maximum number of iterations can be predetermined (e.g., 10, 100, 1000, or other value) and a condition for terminating the iterations can be met when the maximum number of iterations is performed. In certain embodiments, iterations can continue until two or more conditions for terminating the iterations are met.

In certain embodiments, at least one of the surveys used in the method 100 was performed previously and is made available to the computer system performing the method 100 (e.g., residing in computer-readable memory). In certain embodiments, the method 100 further comprises performing at least one survey (e.g., at least one of the first survey and the second survey), for example, by operating the sensors while the survey tool traverses the wellbore section being surveyed. In certain embodiments in which the survey tool is a part of a wellbore drilling system, the at least one survey can be performed while drilling the wellbore section. In certain embodiments, at least one of the surveys is generated using a survey sensor of a steerable wellbore drilling tool, and the method 100 further comprises using at least one updated weighted average surveys to steer the wellbore drilling tool while drilling.

Figure 3:
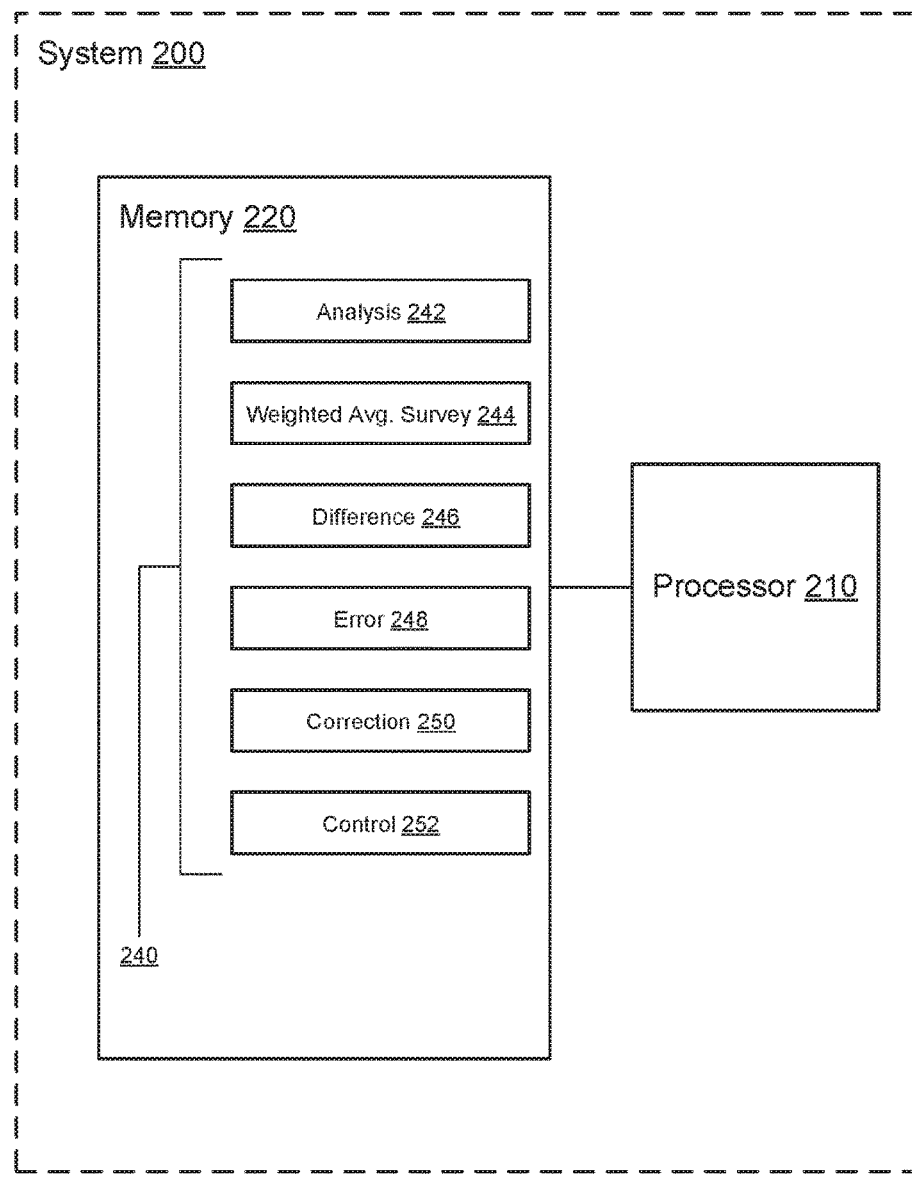
FIG. 3 schematically illustrates an example system for generating a survey of a wellbore section in accordance with certain embodiments described herein.

FIG. 3 schematically illustrates an example system 200 for generating a survey of a wellbore section in accordance with certain embodiments described herein. The system 200 comprises one or more hardware processors 210 (e.g., microprocessors or other computer processors) in communication with at least one computer-readable memory 220 (e.g., tangible memory, read-only memory, dynamic random-access memory, flash memory, hard disk drive, compact disk, and/or digital video disk) that stores software modules 240 including instructions that are executable by the one or more hardware processors 210. In certain embodiments, the at least one computer-readable memory 220 further stores the plurality of surveys (e.g., the survey measurements of two or more surveys) and at least one updated weighted average survey.

The software modules 240 can include at least an analysis computer module 242 configured to instruct the one or more hardware processors 210 to identify survey measurements of at least a first survey and a second survey that do not comprise gross errors. For example, the analysis computer module 242 can be configured to instruct the one or more hardware processors 210 to perform the operational block 110 discussed above to conduct the analysis of the plurality of surveys (e.g., the first survey and the second survey) to identify survey measurements that do not comprise gross errors.

The software modules 240 can further include a weighted average survey computer module 244 configured to instruct the one or more hardware processors 210 to calculate a weighted average survey based on the identified survey measurements of the first survey multiplied by a first weighted function and the identified survey measurements of the second survey multiplied by a second weighted function. For example, the weighted average survey computer module 244 can be configured to instruct the one or more hardware processors 210 to perform the operational blocks 120 and 160 discussed above to generate the initial and updated weighted average surveys.

The software modules 240 can further include a difference computer module 246 configured to instruct the one or more hardware processors 210 to calculate a first set of measurement differences between the identified survey measurements of the first survey and the weighted average survey and to calculate a second set of measurement differences between the identified survey measurements of the second survey and the weighted average survey. For example, the difference computer module 246 can be configured to instruct the one or more hardware processors 210 to perform the operational blocks 130 and 170 discussed above to calculate the initial and updated sets of measurement differences.

The software modules 240 can further include an error computer module 248 configured to instruct the one or more hardware processors 210 to calculate a first estimate of error terms for the first survey using the first set of measurement differences and to calculate a second estimate of error terms for the second survey using the second set of measurement differences (e.g., using least squares estimations). For example, the error computer module 248 can be configured to instruct the one or more hardware processors 210 to perform the operational block 140 discussed above to calculate the estimates of error terms for the plurality of surveys.

The software modules 240 can further include a correction computer module 250 configured to instruct the one or more hardware processors 210 to use the first estimate of error teens to correct the identified survey measurements of the first survey and to use the second estimate of error terms to correct the identified survey measurements of the second survey. For example, the correction computer module 250 can be configured to instruct the one or more hardware processors 210 to perform the operational block 150 discussed above to correct the survey measurements of the plurality of surveys.

The software modules 240 can further include a control computer module 252 configured to instruct the one or more hardware processors 210 to provide the corrected identified survey measurements of the first survey and the corrected identified survey measurements of the second survey such that, iteratively utilizing the instructions of the weighted average survey computer module 244, the difference computer module 246, the error computer module 248, and the correction computer module 250, the one or more hardware processors 210 continue the iterations for generating the survey until one or more conditions for terminating the iterations (e.g., differences between sequential weighted average surveys are within a predetermined tolerance, or other conditions described above) are met.

In certain embodiments, the system 200 comprises one or more survey sensors for two or more inclination surveys (e.g., one or more accelerometers with error terms resulting from at least one of the group consisting of: inclination offset, residual bias, and sag). In certain embodiments, the system 200 comprises one or more survey sensors for two or more azimuth surveys (e.g., one or more gyroscopes with error terms resulting from at least one of the group consisting of: residual bias, mass unbalance offset, and linear drift; one or more magnetic sensors with error terms resulting from axial magnetic interference). In certain embodiments, the system 200 comprises a steerable wellbore drilling tool and the system 200 is further configured to steer the wellbore drilling tool while drilling in response to at least one updated weighted average survey.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A method of generating a survey of a wellbore section, the method comprising:
   acquiring first survey measurements for a first survey of the wellbore section using at least one first survey sensor, and acquiring second survey measurements for a second survey of the wellbore section using at least one second survey sensor;
   analyzing the first survey of the wellbore section to identify survey measurements of the first survey that do not comprise first gross errors, and analyzing the second survey of the wellbore section to identify survey measurements of the second survey that do not comprise second gross errors;
   generating an initial weighted average survey by combining the identified survey measurements of the first survey multiplied by a first initial weighting function and the identified survey measurements of the second survey multiplied by a second initial weighting function;
   calculating a first set of measurement differences between the identified survey measurements of the first survey and the initial weighted average survey, and calculating a second set of measurement differences between the identified survey measurements of the second survey and the initial weighted average survey;
   (a) calculating a first estimate of error terms for the first survey using the first set of measurement differences, and calculating a second estimate of error terms for the second survey using the second set of measurement differences;
   (b) using the first estimate of error terms to correct the identified survey measurements of the first survey, and using the second estimate of error terms to correct the identified survey measurements of the second survey;
   (c) generating an updated weighted average survey by combining the corrected identified survey measurements of the first survey multiplied by a first corresponding weighting function and the corrected identified survey measurements of the second survey multiplied by a second corresponding weighting function;
   (d) calculating an updated first set of measurement differences between the identified survey measurements of the first survey and the updated weighted average survey, and calculating an updated second set of measurement differences between the identified survey measurements of the second survey and the updated weighted average survey;
   (e) using the updated first set of measurement differences and the updated second set of measurement differences, iterating (a)-(d) until one or more conditions for terminating the iterations are met; and
   steering a wellbore drilling tool based on the updated weighted average survey after the iterations are terminated.

2. The method of claim 1, wherein calculating the first estimate of error terms comprises using a first least squares estimation and calculating the second estimate of error terms comprises using a second least squares estimation.

3. The method of claim 1, wherein the first survey and the second survey are independent of one another.

4. The method of claim 1, wherein the second survey sensor is different from the first survey sensor.

5. The method of claim 1, wherein the identified survey measurements from the at least one first survey sensor have a first accuracy and the identified survey measurements from the at least one second survey sensor have a second accuracy different from the first accuracy.

6. The method of claim 1, wherein the first survey and the second survey are inclination surveys, wherein at least one of the first survey and the second survey was generated by one or more accelerometers and has error terms resulting from at least one of the group consisting of: inclination offset, residual bias, and sag.

7. The method of claim 1, wherein the first survey and the second survey are azimuth surveys, wherein at least one of the first survey and the second survey was generated by one or more gyroscopes and has error terms resulting from at least one of the group consisting of: residual bias, mass unbalance offset, and linear drift.

8. The method of claim 7, wherein at least one of the first survey and the second survey comprises a stationary gyroscopic survey.

9. The method of claim 7, wherein at least one of the first survey and the second survey comprises a continuous gyroscopic survey.

10. The method of claim 1, wherein the first survey and the second survey are azimuth surveys, wherein at least one of the first survey and the second survey was generated by one or more magnetic sensors and has error terms resulting from axial magnetic interference.

11. The method of claim 1, wherein the first initial weighting function is different from the second initial weighting function.

12. The method of claim 1, wherein the first initial weighting function comprises error variances of the identified survey measurements of the first survey, and the second initial weighting function comprises error variances of the identified survey measurements of the second survey.

13. The method of claim 1, wherein the first corresponding weighting function is the first initial weighting function and the second corresponding weighting function is the second initial weighting function.

14. The method of claim 1, wherein generating the updated weighted average survey comprises calculating the first corresponding weighting function by updating the first initial weighting function and calculating the second corresponding weighting function by updating the second initial weighting function.

15. The method of claim 1, wherein acquiring the first survey measurements and acquiring the second survey measurements occur at least partially while drilling the wellbore section.

16. The method of claim 1, wherein the one or more conditions comprises:
the updated first set of measurement differences and the updated second set of measurement differences are within a predetermined tolerance;
a maximum number of iterations has been met; or
combinations thereof.

17. A system for generating a survey of a wellbore section, the system comprising:
at least one first survey sensor configured to acquire first survey measurements for a first survey of the wellbore section; and
at least one second survey sensor configured to acquire second survey measurements for a second survey of the wellbore section; and
one or more hardware processors in communication with at least one computer-readable memory that stores software modules including instructions that are executable by the one or more hardware processors, the software modules including at least:
an analysis computer module configured to identify survey measurements of the first survey and the second survey that do not comprise gross errors;
a weighted average survey computer module configured to calculate a weighted average survey based on the identified survey measurements of the first survey multiplied by a first weighted function and the identified survey measurements of the second survey multiplied by a second weighted function;
a difference computer module configured to calculate a first set of measurement differences between the identified survey measurements of the first survey and the weighted average survey and to calculate a second set of measurement differences between the identified survey measurements of the second survey and the weighted average survey;
an error computer module configured to calculate a first estimate of error terms for the first survey using the first set of measurement differences and to calculate a second estimate of error terms for the second survey using the second set of measurement differences;
a correction computer module configured to use the first estimate of error terms to correct the identified survey measurements of the first survey and to use the second estimate of error terms to correct the identified survey measurements of the second survey;
a control computer module configured to provide the corrected identified survey measurements of the first survey and the corrected identified survey measurements of the second survey to the weighted average survey computer module to generate an updated weighted average survey, wherein the weighted average survey computer module, the difference computer module, the error computer module, the correction computer module, and the control computer module are iteratively used until one or more conditions for terminating the iterations are met; and
a wellbore drilling tool configured to be steered based on the updated weighted average survey after the iterations are terminated.

18. The system of claim 17, wherein the at least one second survey sensor is different from the at least one first survey sensor.

19. The system of claim 18, wherein the first survey and the second survey are inclination surveys, wherein at least one of the first survey sensor and the at least one second survey sensor comprise one or more accelerometers with error terms resulting from at least one of the group consisting of: inclination offset, residual bias, and sag.

20. The system of claim 18, wherein the first survey and the second survey are azimuth surveys, wherein at least one of the first survey sensor and the at least one second survey sensor comprise one or more gyroscopes with error terms resulting from at least one of the group consisting of: residual bias, mass unbalance offset, and linear drift.

21. The system of claim 18, wherein the first survey and the second survey are azimuth surveys, wherein at least one of the first survey sensor and the at least one second survey sensor comprise one or more magnetic sensors with error terms resulting from axial magnetic interference.

22. The system of claim 17, wherein the at least one computer-readable memory further stores at least the first survey, the second survey, and at least one updated weighted average survey.

23. The system of claim 17, wherein the error computer module is further configured to calculate the first estimate of error terms for the first survey using a first least squares estimation and to calculate the second estimate of error terms for the second survey using a second least squares estimation.

24. The system of claim 17, wherein the first weighting function is different from the second weighting function.

25. The system of claim 17, wherein the first weighed function comprises error variances of the identified survey measurements of the first survey, and the second weighting function comprises error variances of the identified survey measurements of the second survey.

26. The system of claim 17, wherein the one or more conditions comprises:
an updated first set of measurement differences and an updated second set of measurement differences are within a predetermined tolerance;
a maximum number of iterations has been met; or
combinations thereof.

27. A system, comprising:
at least one survey sensor configured to acquire a plurality of survey measurements for a plurality of surveys of a wellbore section;
one or more processors;
at least one memory comprising instructions which, when executed by the one or more processors, cause the one or more processors to:
analyze the plurality of surveys of the wellbore section to identify survey measurements of the plurality of surveys that do not comprise gross errors;
generate an initial weighted average survey by combining the identified survey measurements of the plurality of surveys multiplied by initial weighting functions;
calculate a set of measurement differences between the identified survey measurements of the plurality of surveys and the initial weighted average survey;
(a) calculate a plurality of error term estimates for the plurality of surveys using the set of measurement differences;
(b) use the plurality of error term estimates to correct the identified survey measurements of the plurality of surveys;
(c) generate an updated weighted average survey by combining the corrected identified survey measurements of the plurality of surveys multiplied by corresponding weighting functions;
(d) calculate an updated set of measurement differences between the identified survey measurements of the plurality of surveys and the updated weighted average survey; and
(e) use the updated set of measurement differences, iterating (a)-(d) until one or more conditions for terminating the iterations are met; and
a wellbore drilling tool configured to be steered based on the updated weighted average survey after the iterations are terminated.

* * * * *